(12) United States Patent  
Gaia

(10) Patent No.: US 8,616,493 B2  
(45) Date of Patent: Dec. 31, 2013

(54) DEVICE AND METHOD FOR A ROTATION OF THE WHEELS OF THE LANDING GEAR OF AIRCRAFT

(76) Inventor: Mario Gaia, Cassina de' Pecchi (IT)

(*) Notice: Subject to any disclaimer, the term of this patent is extended or adjusted under 35 U.S.C. 154(b) by 100 days.

(21) Appl. No.: 13/394,535

(22) PCT Filed: Sep. 6, 2010

(86) PCT No.: PCT/IT2010/000385
§ 371 (c)(1),
(2), (4) Date: Mar. 6, 2012

(87) PCT Pub. No.: WO2011/030365
PCT Pub. Date: Mar. 7, 2011

(65) Prior Publication Data
US 2012/0160956 A1    Jun. 28, 2012

(30) Foreign Application Priority Data
Sep. 10, 2009   (IT) .............................. BS2009A0165

(51) Int. Cl.
*B64C 25/50*    (2006.01)
(52) U.S. Cl.
USPC .......................... 244/50; 244/111; 244/103 S
(58) Field of Classification Search
USPC ..................... 244/50, 111, 103 R, 103 S, 51
See application file for complete search history.

(56) References Cited

U.S. PATENT DOCUMENTS

| 2,425,583 | A | * | 8/1947 | Volk | 244/103 S |
| 3,236,338 | A | * | 2/1966 | Mayer | 188/270 |
| 3,977,631 | A | * | 8/1976 | Jenny | 244/50 |
| 6,402,259 | B2 | * | 6/2002 | Corio et al. | 303/20 |
| 6,450,448 | B1 | * | 9/2002 | Suzuki | 244/104 FP |
| 6,702,068 | B1 | * | 3/2004 | Riebe | 188/71.5 |
| 7,594,626 | B2 | * | 9/2009 | Soderberg | 244/103 S |
| 7,703,717 | B2 | * | 4/2010 | Soderberg | 244/103 S |
| 7,731,124 | B2 | * | 6/2010 | Griffin | 244/102 R |
| 8,109,463 | B2 | * | 2/2012 | Cox et al. | 244/50 |
| 8,123,163 | B2 | * | 2/2012 | McCoskey et al. | 244/110 A |
| 8,136,755 | B2 | * | 3/2012 | Hadley et al. | 244/50 |
| 8,136,761 | B2 | * | 3/2012 | Kiyosawa | 244/103 R |
| 8,201,774 | B2 | * | 6/2012 | Gieras et al. | 244/111 |
| 2005/0224642 | A1 | * | 10/2005 | Sullivan | 244/111 |
| 2009/0120739 | A1 | * | 5/2009 | Corio | 188/73.32 |
| 2010/0288873 | A1 | * | 11/2010 | Cox et al. | 244/50 |
| 2011/0132704 | A1 | * | 6/2011 | Hanlon et al. | 188/156 |
| 2012/0126053 | A1 | * | 5/2012 | Christensen et al. | 244/50 |
| 2012/0138735 | A1 | * | 6/2012 | Nierlich | 244/50 |

* cited by examiner

*Primary Examiner* — Christopher P Ellis
*Assistant Examiner* — Medhat Badawi
(74) *Attorney, Agent, or Firm* — Volpe and Koenig, P.C.

(57) ABSTRACT

The invention concerns a device and a method to cause the rotation of at least one wheel of the landing gear of aircraft, according to which between the supporting structure (12) of the landing gear and the brake group of the wheel is placed at least an actuator element with variable geometry (35) controlled and managed to develop such a force in order to impose an intermittent angular rotation of the wheel (15) when the brake group is operated.

10 Claims, 5 Drawing Sheets

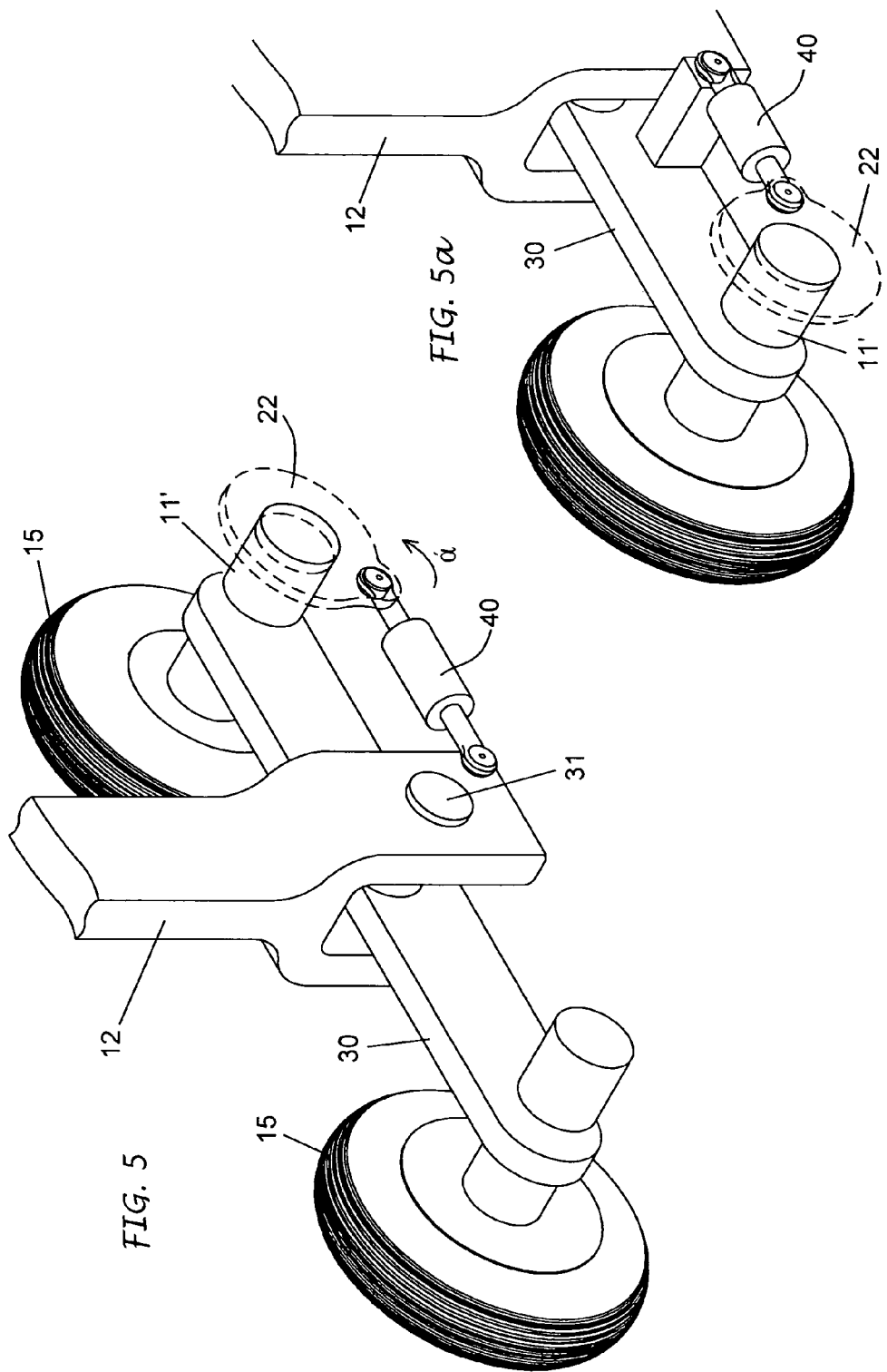

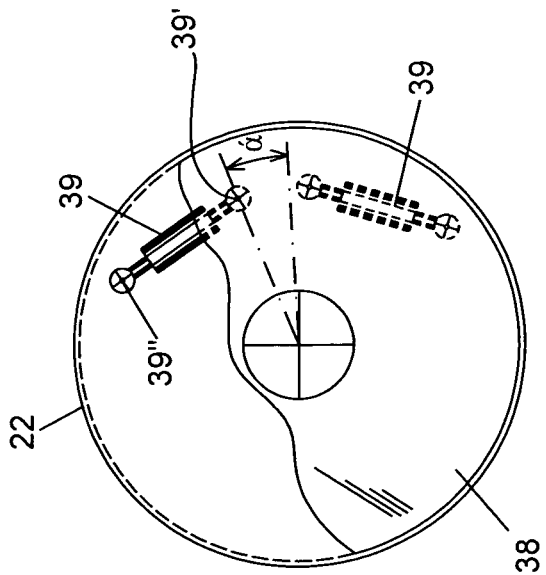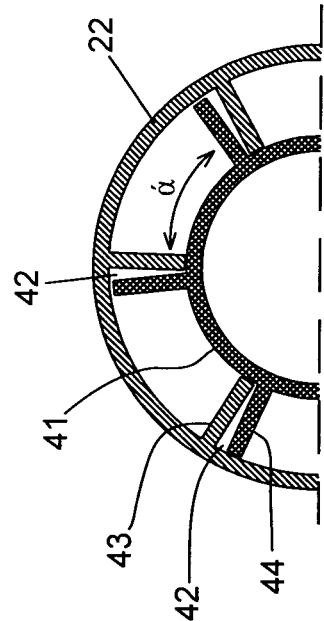

DEVICE AND METHOD FOR A ROTATION OF THE WHEELS OF THE LANDING GEAR OF AIRCRAFT

FIELD OF THE INVENTION

This invention concerns the aircraft, in particular their landing gear and more precisely a device and a method to cause a rotation of the wheels of the landing gear at least for the movements on the ground of such vehicles.

STATE OF THE TECHNIQUE

The landing gear is a system that enables an aircraft to be supported when it is not flying, to amortize the energy from the contact with the ground during the landing phases and to facilitate the movements on the ground of the aircraft on the airport parking areas.

The landing gear can be fixed or retractable; each with a single wheel or with one or more rows of coupled wheels and is equipped with a braking system. This consists more usually in disk brakes controlled hydraulically, housed inside the wheels of the landing gear. The is functions of the braking system are basically to: participate in the stopping operation of the aircraft during landing; to control its speed on the runway; to enable the aircraft to turn thanks to the possibility of differentiating the braking of the wheels; to keep the aircraft stopped when the motors are in the "warming-up" phase.

In any case, the aircraft are generally designed to move both during taxiing on the runway, and on taking off, when flying, when landing, and when in the approach phase towards the boarding/disembarkation walkways (fingers), only moving forwards, thanks to the thrust of the motors or the propellers. In other words, also for the movements on the ground, when only moving forwards using the same propulsion system, even at a low power, the same as the one used by the aircraft when flying. The function of the propulsion system at a low power for the movements on the ground of an aircraft, the movements on the ground being however not very efficient, means an important, costly consumption of fuel, an increase in the level of air pollution and it is the source of noise on approaching the airports.

Therefore, the manoeuvres on the ground by aircraft have always been a problem at least for the considerable limits and disadvantages that they involve. So, still today, at least where manoeuvres backwards are required, for example, for moving the aircraft back from the fingers, and its predisposition towards the new taxiing and/or to be towed towards a place of shelter or maintenance, the use of a tractor to attach itself to one of the trolleys of the aircraft (usually the front turning trolley) by means of a tow pole. And so the tractor is an external vehicle that takes care of the positioning of the aircraft in the condition suitable to then allow independent motion with the use, however, of the propulsion system on board.

Truly, some mechanical devices to drive the wheels of the landing gear and also to allow movements and manoeuvres of the aircraft on the ground without external help and/or to cause the wheels of the landing gear to turn before they come into contact with the runway so as to reduce the difference in the relative speed between the wheels and the runway and to limit slipping and wear of the tyres, have already been proposed. For example, the documents U.S. Pat. No. 2,460,387 and WO 95/29094 are representative of the state of the technique of interest and describe the adoption of an hydraulic or electric motor to work together, by means of a differential, with the wheels of the landing gear becoming drive wheels.

The documents U.S. Pat. No. 3,005,510 and U.S. Pat. No. 3,762,670 prove the use of an auxiliary mechanism consisting in a rotating coupler device, in the shape of a drum or belt, which is operated by a respective motor and which rests and engages peripherally on the tyre of a wheel making the latter rotate. However, in the first case it would be necessary to re-design and also largely modify the landing gear so as to be able to incorporate the motor and control differential; in the second case the control mechanism is on the outside of the tyre of the wheels in a position and with unacceptable volume.

The same applicant, in one of his previous patent applications, proposed a brake device for vehicle wheels that comprises at least a revolving brake connected to a wheel or to its rotation axis, and also at least a mobile calliper movable angularly compared to the brake disk. The mobile brake calliper can be started alternately so as to engage the brake disk to make it rotate continuously and in one direction and together with it the wheel it is connected to and with it the advance of the vehicle even if intermittently. However this device does not seem to be immediately applicable to the landing gear in that the latter is equipped with a braking system that does not include a brake calliper intended as the one for the aircraft on the ground.

AIM OF THE INVENTION

This invention is on the contrary addressed at actually resolving in an innovative way the technical problem explained beforehand, by making the wheels of the landing gear of aircraft "drive wheels", both backward and forward, without having to resort either to external help or to the thrust of the motors or the propellers, therefore without useless consumption of fuel and in safety conditions also when near the fingers.

The aim of this invention is in fact to propose a device and a method for the movements and manoeuvres on the ground autonomously by aircraft, however and advantageously without the addition of specific motors, without having to carry out substantial changes to the usual structure and configuration of the landing gear and without substantially affecting their volume.

The autonomous motor capacity can be useful in the management of the aircraft to facilitate the manoeuvres on the ground and, for example, but not to a limited extent, also to reduce the consumption of the motors during waiting in line before taking off. The capacity of an aircraft to autonomously move can furthermore be an important safety element, for example in the case of an adjacent aircraft catching fire or an air terminal to which it is connected by a finger.

The aim of the invention is reached by means of a device able to cause the rotation of the wheels of the landing gear of aircraft according to the independent characteristics 1. Other particular aspects of the same device are referred to in the claims below.

The invention also concerns a method for commanding and controlling the rotation of the wheels of the aircraft landing gear according to claim 7.

Therefore, in principal the invention was conceived to use the brake set of all or some landing gear wheels of an aircraft not only and again as a usual braking system, but also for an additional function, which commonly, both for itself and for its configuration, the brake set is not able to carry out nor has it ever been thought that it could be carried out. In fact, the brake set is no longer and only used as a means for absorbing and dispelling energy in order to slow down, and stop an aircraft during the landing phases and/or taxiing or keeping it in a stationary position as usually happens and as it can still take place, but also and advantageously as a part of a propulsion system able to supply a thrust at least for the movements and manoeuvres on the ground, both forwards and backwards of an aircraft when integrated and managed, according to the invention, by variable geometric control means of a minimum size and easy control.

When it is started, a brake working with a wheel, which is generally the same for all the wheels including those of the landing gear, is designed to slow down so as to stop the rotation of the wheel itself.

When the brake is idle, the wheel can however rotate applying a deflecting torque to it or through the driving of a shaft the wheel is attached to so as to turn it on or, because of the rubbing that the wheel encounters when resting on the ground while the aircraft moves thrusted by the relative propulsion system, as happens in the aircraft landing gear where each wheel can be turned, and basically "idle", that is to say free to rotate around an axis or fixed shaft.

Differently, with the device of this invention the deflecting torque is transmitted to the wheel to be operated by means of the respective brake set, when the latter is active, with angular movements of the brake itself compared to the shaft of the wheel, movements which when to repeated determine the application, even intermittently, of a rolling moment of the wheel from time to time in the desired direction according to the forward or backward movement of the aircraft.

BRIEF DESCRIPTION OF THE DRAWINGS

Some preferred examples of the invention are illustrated in the attached drawings and are explained in a more detailed way making reference, purely indicative and not limiting, to some well known landing gears. In said drawings:

FIG. 5 shows a method of applying the invention to the landing gear as schematized in FIG. 2;

FIG. 5a shows a variation of the application in FIG. 5;

FIG. 6 shows a cross section of a variation in the application of the device, according to the invention of a system such as the one in FIG. 1;

FIG. 7 shows a view according to arrows X-X in FIG. 6; and

FIG. 8 shows a variation of the control actuator for invention device.

DETAILED DESCRIPTION OF THE INVENTION

Figure 1:
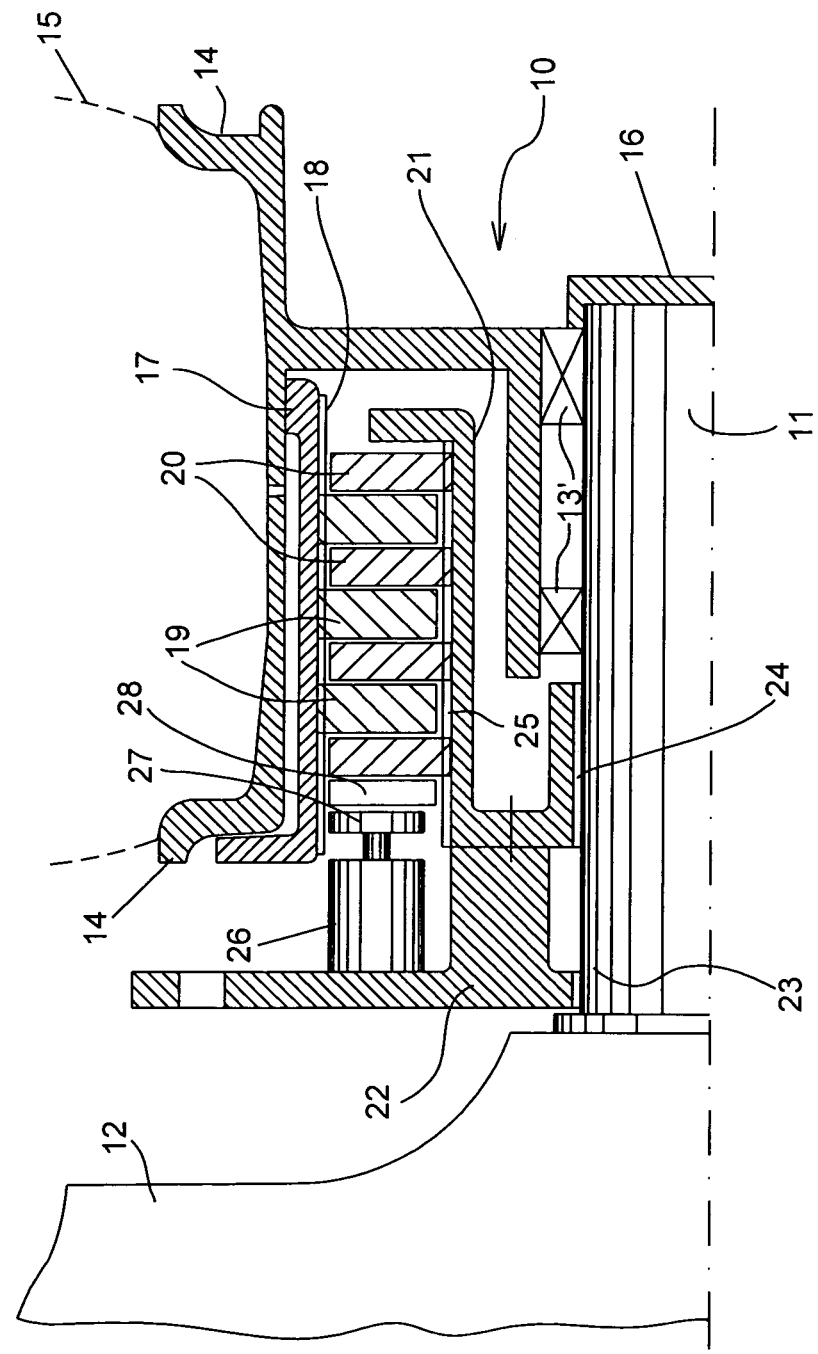
FIG. 1 shows a schematic view, in cross section, of part of a wheel-brake-support system of a landing gear for aircraft according to the state of the technique.

The wheel-brake-support system of a landing gear 10 schematized in FIG. 1 is the type in use on many aircraft, and is therefore well known and is shown only as an example. Its representation, the same applying to every other one reproduced in the remaining figures, is simplified, different elements having been omitted which are necessary for the correct mechanical realisation, above all to be carried out according to the known technique.

The system comprises a shaft 11, in this case not rotating, connected rigidly or integral with a supporting structure 12 of the carriage. On the shaft 11 is mounted, with the interposition of bearings 13', a wheel rim 13 provided with an extension 14 to which is anchored a tyre 15. The wheel rim 13 is free to rotate compared to the shaft 11, whereas an opportune head cover 16 prevents the axial from sliding off the shaft.

Between the shaft 11 and the wheel rim 13 is provided a brake set with a rotor and a stator part.

The rotor part comprises a rotor element 17, coaxial with the shaft 11, constrained to the wheel rim 13 and bearing a whole of grooves 18 in which rotor brake disks 19 are engaged, spaced in parallel. These rotor disks 19, therefore, are constrained to the rim 13 as regards to the rotation, but free to move in the axial direction.

The stator part of the brake set comprises stator brake disks 20 mounted around a tube 21 which is connected to a flange 22 mounted on, and held concentric to, said shaft 11 by means of cylindrical couplings 23, 24, that can be in the form of bushings or bearings. The stator brake disks 20 are placed between the rotor brake disks 19 and constrained in axial grooves 25 provided in the periphery of the tube 21. They are therefore free to slide axially, but constrained, as regards to the rotation of the flange 22.

A group of actuators 26, that can be of the hydraulic, electric or electromechanical type, constrained to the flange 22, when activated they compress, by means of the respective plugs that can be the hydraulic, electric or electromechanical type constrained to the flange 22, when activated compress, by means of the respective plugs 27 and a ring of the thrust 28, the different rotor and stator brake disks 19, 20 one against the other, forming a pack, therefore generating, due to the rubbing, a tangential brake force that is transmitted to the wheel. The sum of the tangential actions between the rotor and stator disks of the brake set forms the brake effect of the system, capable of stopping the aircraft. The sum of said tangential actions tends on the other hand, to make the flange turn 22; to avoid this rotation a connecting rod 29 is used connected to a part of the flange 22 and on the other part to the constrained structure 12 of the landing gear 10.

Figure 2:
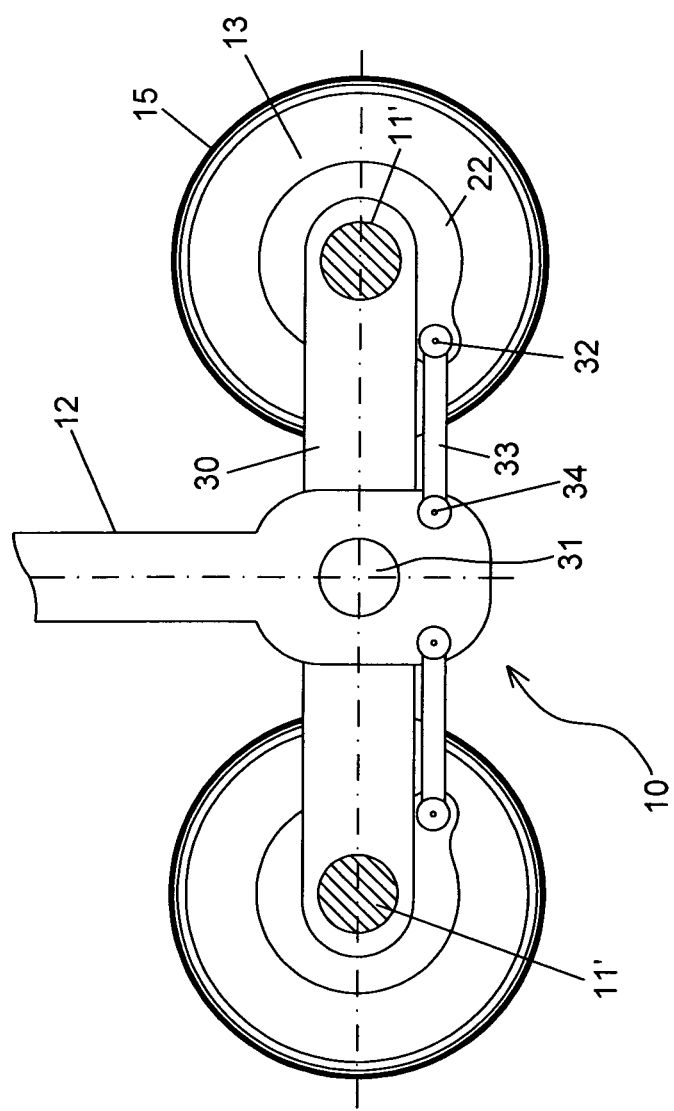
FIG. 2 shows a front view of a landing gear with two axles for two respective pairs of wheel.

FIG. 2 represents one of the possible solutions in case of a landing gear 10 with two shafts 11', 11' for two pairs of wheels 13 as detailed later in FIG. 5. So, according to a traditional construction, the two axes are supported by a connecting crosspiece 30 pivoted to the supporting structure 12 by a pin 31, and the flange 22 of each brake set is connected, by means of a first pin 32, to a connecting rod 33 which in its turn is connected to the supporting structure 12 of the carriage by a second pin 34. During landing, the taxiing, etc., the crosspiece 30 connecting the two axes of the wheels of the carriage is free to oscillate around a pin 31. It follows that the flange 22 of each brake set must perform small rotations compared to the shaft 11' it is associated with, allowed by the cylindrical connection 23, 24 between the flange and the shaft.

According to the invention, between the flange 22 of the brake set and the supporting structure 12 of the landing gear is mounted at least an actuator device having variable geometry 35 but able to develop, on command, a force to impose on the flange a rotation of a small angle and to synchronise the rotation by control of the brake set.

In fact, when the brake set is operated, an angular rotation of the flange 22 by the actuator device using variable geometry 35 causes, by means of the stator and rotor parts of the brake tightened between them, the application of a deflecting torque to the wheel rim, consequently to the wheel, for its rotation at a similar small angle.

Towards the end of the rotation set by the flange, the brake is released and the rotation of the wheel can also continue by inertia, so the aircraft is induced to move on the ground, whereas the actuator device returns the flange to the initial position for a successive propulsion cycle.

Continuous movement is therefore achieved by means of a sequence of small angular movements set and then successive release of the flange by the variable geometry actuator so that, in this way, the aircraft moves thanks to a series of brief motor impulses transmitted to is the active wheels the device is attached to.

Synchronizing drive and release of the brake set by the go and return action of the actuator 35 it will be possible to cause the aircraft to move, both forward and backwards, according to the requirements and carry out all of the manoeuvres on the ground by using the steering wheels of the landing gear.

Figure 3:
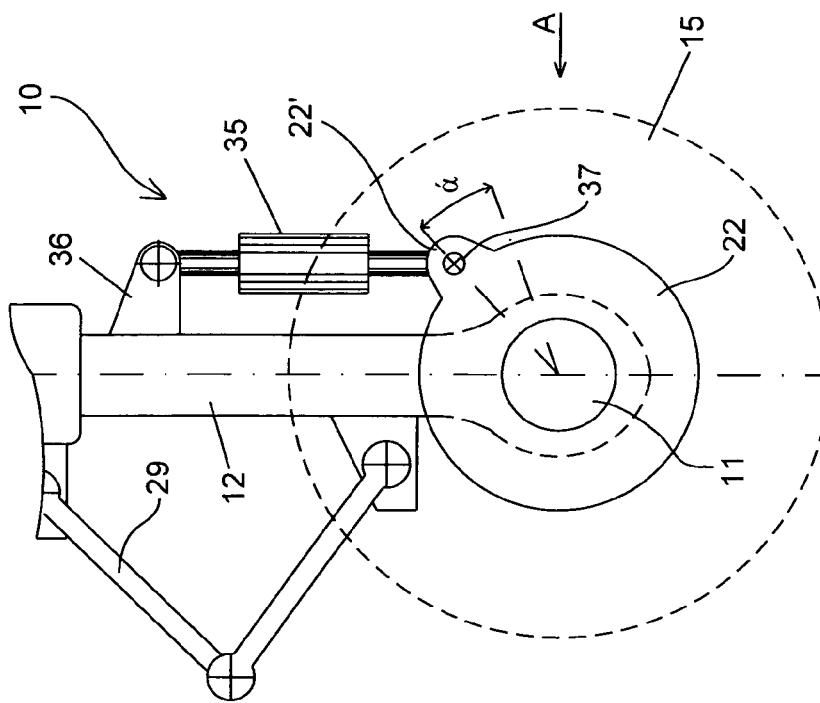
FIG. 3 shows a way of application of the invention to a wheel-brake-support system as shown in FIG. 1.
Figure 4:
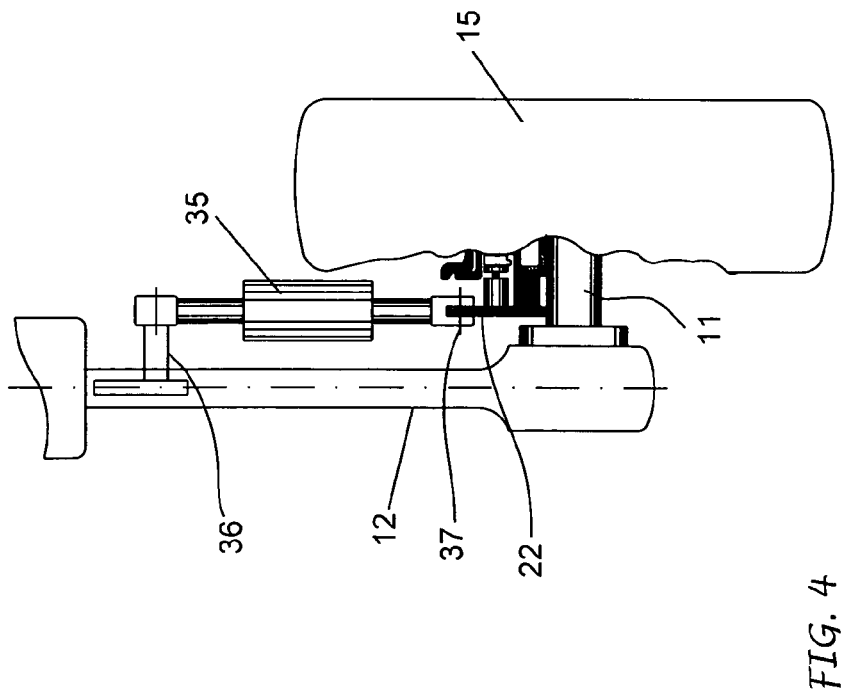
FIG. 4 shows, in a partial cross section, a view of the assemblage in FIG. 3, in the direction of the A arrow.

In FIGS. 3 and 4 is shown, in particular, the device attached to a landing gear 10 with only one axis. The element with variable geometry 35 is pivoted on one side, in a hitch point 36, constrained directly or indirectly to the supporting structure 12 and on the other side, tangentially, by means of a pivot 37, in line with an eye 22' of the flange 22. This variable geometry element 35 can be made up of a hydraulic cylinder or an electric or electromechanical linear actuator capable of undertaking variable lengths consequently to impose a variation of the distance between the point of constraint 36 to the supporting structure of the connecting undercarriage 37 to the flinger 22. As shown in FIG. 3 the extension of the actuator 35 causes a rotation of the flange 22 at an alpha angle at each of its operations.

As an alternative to the variable length actuators described above, the variable geometry element 35 provided to generate rotation of the flange 22 at an alpha angle can be made up of an additional fixed disk 38 rigidly constrained to the supporting structure 12 of the undercarriage and holding one or more variable length actuators 39 positioned at a tangent and each one connected, on one side, in 39', to the disk itself and on the other side in 39" to the flange 22 as shown in FIGS. 6 and 7. A solution where several actuators are available and which would have, compared to the one with a single actuator 35, the advantage, as described above and shown in FIGS. 3 and 4, that with an equal force used to cause the rotation of the wheel by means of the activated brake, actuators 39 with smaller dimensions and less volume can be used.

According to another realisation method between and additional disk 41 constrained to the supporting structure 12 of the landing gear 10 and the mobile flange 22 susceptible to angular rotation on the shaft 11, more radial chambers 42 with variable volumes can be provided, defined by respectively solid partitions 43, 44 with the additional disk and with the flange as shown in FIG. 8. When each of said chambers 42 is fed by a fluid under pressure, the partitions 4d integral with the flange, are spaced by the integral partitions to the fixed disk causing in this way from time to time, also in this case, thanks to the angular rotation movement of said flange, a rotation of an angle of the wheel.

In the case of systems with a large number of axes, in the place of each connecting rod 29—FIG. 2—or another equivalent connection element in even more complex landing gear, for the control of the rotation of the wheels a variable length actuator 40 can be used, connected on one side, tangentially to the flange 22 and on the opposite side to the supporting structure 12 as shown in FIG. 5 or to the crosspiece 30 as shown in FIG. 5a. In this form of realisation, although not shown, can be useful to introduce also a flexible element, either on the actuator 40 (for example, a flexible support)), or in the hydraulic circuit (for example, a compensator volume, if the actuator is hydraulic) to compensate the angular variations set up by the crosspiece connection position 30 in relation to the roughness of the track. In this case, each actuator, when inactive, acts as a rigid element and a connecting rod in the same way as the connecting rod in FIG. 2; when on the other hand it is activated it allows the angular rotation of the flange 22 and, consequently the rotation of the wheel as soon as the respective brake set is operated.

The application to the landing gear 10 of a device according to the invention, until the control actuator or actuators 35, 39, 40, 42 are idle, have no influence on the normal use of the brake group of the wheels, which can be activated or deactivated in a way and according to the traditional function. The device will on the other hand be connected and managed by an opportune programmed control system and able to measure the rotation speed of the wheel it works directly with, for example, by means of an encoder on the disk of the controlled wheel, or indirectly by measuring the speed of the adjacent wheels.

In the case in which the aircraft is at first stopped, it is therefore incipient motion and for example it is intended to cause a clockwise rotation (referring to FIG. 3), the actuator needs to be in the minimum length condition, with the brake not activated. At this stage the control system enables the operation of the brake group making flange 22 and wheel 13 integral and successively controls the elongation of the actuator 35, either imposing a controlled movement (electric or electromechanical) or by imposing a force (an hydraulic case) or an opportune combination of the two. A little before the completion of the first "alpha" rotation the brake is deactivated from the control system, the wheel remains free to continue its rotation, supporting the inertia of the aircraft while the actuator can return to its initial condition.

For the case of aircraft already in motion, the sequence will be modified based on the fact that the elongation of the actuator 35 begins with an inactive brake group and that the brake operation must be set at the moment the control system recognizes a basic equality between the calculated speed of the wheel and the speed that will be set for the wheel by the actuator when the brake is auctioned. The elongation of the actuator then contributes with the law set by the control system until, just before the completion of the "alpha" rotation the brake is deactivated, the actuator is returned to the minimum length and the system is ready for a further sequence.

The sequence for obtaining the rotation in the anti-clockwise direction of the wheel is fully analogous.

The operation of the various devices the aircraft can be provided with will preferably take place staggered over a period of time, so as to make the absorption of the power for the actuators more uniform and to reduce the discontinuous accelerations the aircraft becomes subjected to.

It will also be sufficient for only some of the wheels to be provided with the proposed device in that the accelerations imposed on the aircraft will always be modest, both for the comfort of the passengers and for the question of safety, so that even a few active wheels can be sufficient to confer the force and consequently the required acceleration.

The number of wheels will be the same quantity as the extension of the active period of the device, a brake group operated, compared to the inactive one, a deactivated brake, so that the return time of the actuator to the initial position after each active phase can be shortened by a faster speed than the one for the actuator without a load.

A contra-rotating action of some of the wheels of the landing gears respectively right and left can be used to obtain the rotation of the aircraft around itself. Analogously, a differentiated operation of the wheels controlled by a relative device can be used to cooperate with the imposition of a preferred direction on the part of the steering wheels of the aircraft.

The device described can also be useful to cause the rotation of the respective wheel used before the contact between tyre and runway so as to reduce the difference in speed between the part at a standstill, the runway, and the rotating part, and the wheel. By that there is the advantage of lowering the wear on the tyre and the generation of polluting compost due to the heating of the rubber of the tyre, even if, however, the speed that the device will be capable of imposing on the wheel will be very modest compared to the relative speed at the moment of contact between the runway and the tyre. A further function of the device lies in the possibility of a verification of the fact that before the contact with the runway the wheels are free to turn and are not blocked, for example by the formation of ice in the bearings or other possibilities.

Lastly, it should be understood that the invention described above is analogously applicable also to the landing gear wheels in which the wheel rim has an axial extension supported and turning on a non turning shaft and a brake group positioned coaxially on the outside of said axial extension, between the latter and a sleeve supported on the shaft and also provided with a flange to connect to it at least an actuator designed to cause a wheel to rotate when the brake group is operated. In the same way, the invention will be also applicable to the landing gear in which the shaft of the wheel or wheels are rotating, the rim of which is fixed, therefore turning, with said shaft and the brake group is however positioned between each wheel and a coaxial sleeve to said shaft and provided with a flange to connect one or more control means, with variable geometry, to it.

The invention claimed is:

1. Device for the rotation of at least one wheel of a landing gear, for movement of an aircraft on the ground, the landing gear comprises a shaft carried by a stationary supporting structure, a wheel rim rotating on or with said shaft, a brake set with a turning part associated and turning with the wheel rim and a statoric part associated with said shaft by a sleeve integral with a flange, and a mechanism to apply and release the brake set, the sleeve and flange (21, 22) are capable of angular movements on said shaft, wherein between the supporting structure (12) of the landing gear and the brake set (19, 20) is mounted at least one actuator element with variable geometry (35, 39, 40, 42) controlled and managed to provide sufficient force to cause the flange (22) move through an angular movement on said shaft and cause an intermittent rotation of the wheel when the brake set is applied and, by this, said flange becomes integral with the wheel rim.

2. Device according to claim 1, wherein the at least one actuator element with variable geometry (35) is constrained on one side, directly or indirectly, to said supporting structure (12) and on an opposite side is connected at a tangent to said flange (22).

3. Device according to claim 1, wherein the at least one actuator element with variable geometry (39) is mounted between said flange (22) and an added disk (38) rigidly constrained to said supporting structure, the actuator element being oriented at a tangent between, and connected to, said flange on one side and to said fixed disk on an opposite side.

4. Device according to any of claim 1, wherein the at least one actuator element with variable geometry is variable in length and is provided with a hydraulic cylinder.

5. Device according to claim 1, wherein at least an actuator element with variable geometry comprises a linear electric or an electromechanical actuator.

6. A method for causing the rotation of at least one wheel of a landing gear of an aircraft through a brake set associated with the wheel, where the brake set has a part of it constrained to a flange capable of angular movements on and relatively to a shaft acting as a rotation axis of the wheel, comprising the steps of:
   a. connecting at least one control actuator element to said flange to be switched on and switched off, under control, on the basis of an active and idle state of the brake set,
   b. operating, starting from an initial idle position, said control actuator element for applying a tangential force to said flange so as to cause its angular movement when the brake set is active and to transmit a corresponding angular rotation of the wheel through said brake set,
   c. deactivating the brake set and said at least one actuator element on termination of said angular movement of the flange to return the flange and the actuator to their initial positions,
   d. repeating in sequence steps b. and c. for an intermittent unidirectional rotation of the wheel.

7. Method according to claim 6, wherein the control actuator of said flange is managed to be switched on and switched off according to the rotation speed of the wheel, said rotating speed being directly or indirectly measurable.

8. Method according to claim 6, wherein when the aircraft is initially on the ground and the wheel is idle, in sequence the operation of the brake set is enabled, the control actuator is operated to cause by its stroke and by the brake set of the wheel an angular movement of the flange, and, at the proximity of the end of the stroke of said actuator, the brake set and the actuator element are deactivated, leaving the wheel to continue to turn, supporting the inertia of the aircraft, while the at least one actuator element returns to an initial position.

9. Method according to claim 6 wherein, with the aircraft on the ground and the wheel rotating in sequence, the actuator element is operated when the brake set is idle, the brake set is activated when the rotation speed of the wheel and the speed which the actuator would set for the wheel on applying the operation of the brake set, are basically the same, so as to cause the rotation of the wheel through the actuator element, and that, at the proximity of the end of the stroke of said actuator, the brake set is deactivated and the at least one actuator element is switched off for its return to an initial position.

10. Method according to claim 6, wherein when the landing gear has several wheels each made to turn by at least a control actuator, the operation of said wheels can be operated in a timely graduated way.

* * * * *